US010610766B2

(12) United States Patent
Shigeta

(10) Patent No.: US 10,610,766 B2
(45) Date of Patent: Apr. 7, 2020

(54) SHUFFLED PLAYING CARD AND METHOD OF MANUFACTURING PLAYING CARD

(71) Applicant: ANGEL PLAYING CARDS CO., LTD., Shiga (JP)

(72) Inventor: Yasushi Shigeta, Shiga (JP)

(73) Assignee: ANGEL PLAYING CARDS CO., LTD., Shiga (JP)

(*) Notice: Subject to any disclaimer, the term of this patent is extended or adjusted under 35 U.S.C. 154(b) by 0 days.

(21) Appl. No.: 16/134,689

(22) Filed: Sep. 18, 2018

(65) Prior Publication Data

US 2019/0091556 A1 Mar. 28, 2019

(30) Foreign Application Priority Data

Sep. 22, 2017 (JP) .................. 2017-182036

(51) Int. Cl.
*A63F 1/02* (2006.01)
*G07F 17/32* (2006.01)
(Continued)

(52) U.S. Cl.
CPC .................. *A63F 1/02* (2013.01); *A63F 1/12* (2013.01); *G07F 17/3241* (2013.01);
(Continued)

(58) Field of Classification Search
CPC .......... A63F 2250/58; A63F 2009/2419; A63F 2009/242; A63F 1/062; A63F 3/0655;
(Continued)

(56) References Cited

U.S. PATENT DOCUMENTS 4,817,528 A * 4/1989 Baker ....................... A63F 1/00
101/368
5,188,370 A * 2/1993 Vlahos .................... A63F 3/065
206/390
(Continued)

FOREIGN PATENT DOCUMENTS

AU 2014413384 A1 7/2017
CN 101873880 A 10/2010
(Continued)

OTHER PUBLICATIONS

PCT application No. PCT/JP2018/034121, International Search Report Report dated Oct. 30, 2018.
(Continued)

*Primary Examiner* — Benjamin Layno
(74) *Attorney, Agent, or Firm* — Norton Rose Fulbright US LLP

(57) ABSTRACT

There is provided a shuffled playing card, wherein a suit and a rank are printed on one surface of a card base sheet, and a back pattern is printed on another surface, different sheet IDs for one card base sheet or each of a plurality of card base sheets are printed on the card base sheet, one deck or a plurality of decks are formed by individual cards cut by a cutting machine from the card base sheet, the one deck or the plurality of decks are shuffled by a shuffle machine to form a set of shuffled playing cards, different shuffled playing card IDs for each set are assigned to the shuffled playing card as ID codes, and the sheet ID of the playing card constituting the shuffled playing card and the shuffled playing card ID are associated with each other in a database.

28 Claims, 7 Drawing Sheets

(51) Int. Cl.
*A63F 1/12* (2006.01)
*A63F 1/06* (2006.01)
*A63F 9/24* (2006.01)

(52) U.S. Cl.
CPC .......... *G07F 17/3293* (2013.01); *A63F 1/062* (2013.01); *A63F 2001/022* (2013.01); *A63F 2001/027* (2013.01); *A63F 2009/242* (2013.01); *A63F 2009/2419* (2013.01); *A63F 2250/52* (2013.01); *A63F 2250/58* (2013.01)

(58) Field of Classification Search
CPC ................ A63F 3/065; A63F 2001/022; A63F 2001/027; A63F 1/02; A63F 1/12
USPC .............................. 273/292, 139, 138.1, 293
See application file for complete search history.

(56) References Cited

U.S. PATENT DOCUMENTS

| | | | |
|---|---|---|---|
| 5,259,907 A | 11/1993 | Soules et al. | |
| 8,371,583 B2* | 2/2013 | Shigeta | A63F 1/02 |
| | | | 273/149 R |
| 9,314,689 B2 | 4/2016 | Chun | |
| 10,022,618 B2* | 7/2018 | Shigeta | A63F 1/10 |
| 2001/0031660 A1* | 10/2001 | Wilk | A63F 3/0645 |
| | | | 463/19 |
| 2004/0026636 A1* | 2/2004 | Shigeta | A63F 1/02 |
| | | | 250/556 |
| 2004/0259618 A1 | 12/2004 | Soltys et al. | |
| 2010/0314834 A1 | 12/2010 | Shigeta | |
| 2010/0327525 A1 | 12/2010 | Shigeta | |
| 2013/0292902 A1 | 11/2013 | Shigeta | |
| 2015/0238849 A1 | 8/2015 | Shigeta | |
| 2016/0263469 A1 | 9/2016 | Shigeta | |

FOREIGN PATENT DOCUMENTS

| | | |
|---|---|---|
| CN | 103287637 A | 9/2013 |
| CN | 104661714 A | 5/2015 |
| EP | 2228106 A1 | 9/2010 |
| JP | 2008012360 A | 1/2008 |
| JP | 2011024603 A | 2/2011 |
| JP | 2016129626 A | 7/2016 |
| JP | 2016129627 A | 7/2016 |
| JP | 2016-146934 A | 8/2016 |
| TW | 201332620 A1 | 8/2013 |
| WO | 2009/069708 A1 | 8/2009 |

OTHER PUBLICATIONS

European application No. 18195791.1, European Search Report Report dated Nov. 30, 2018.
Japanese patent application No. 2018-169522, Office Action dated Aug. 6, 2019.
Macao application No. I/1585, Office Action dated Sep. 3, 2019.
Search Report, PH Application No. 1/2018/000274, dated Jul. 24, 2019, which cites the documents herein.

\* cited by examiner

FIG.8

| SHUFFLE PLAYING CARD ID | SHEET ID | PRINTING DATE | CUTTING DATE |
|---|---|---|---|
| AB0004 | 00001 | 20170801 | 20170803 |
| | 00002 | 20170801 | 20170804 |
| | 00003 | 20170801 | 20170804 |
| | 00004 | 20170801 | 20170804 |
| AB0005 | 00005 | 20170801 | 20170804 |
| | 00006 | 20170802 | 20170804 |
| | 00007 | 20170802 | 20170804 |
| | 00009 | 20170802 | 20170805 |
| ⋮ | ⋮ | ⋮ | ⋮ |

SHUFFLED PLAYING CARD AND METHOD OF MANUFACTURING PLAYING CARD

CROSS REFERENCE TO RELATED APPLICATION

The present application claims priority to JP Application No. 2017-182036 filed Sep. 22, 2017, which is incorporated herein by reference.

BACKGROUND

Technical Field

The present invention relates to a shuffled playing card and a method of manufacturing a playing card.

Related Art

In various playing card games such as poker, baccarat, bridge, and blackjack, a dealer sets playing cards of one deck or a plurality of decks on a card shooter and the like, delivers the playing cards one by one from the card shooter, and distributes the playing cards to a game participant. At this time, in order to guarantee fairness of the game, these cards need to be distributed randomly, so a game sponsor needs to sufficiently shuffle the playing cards randomly before setting the playing cards on the card shooter.

However, when the game sponsor performs shuffling prior to the game, it may take a long time to shuffle cards, which is a factor of hindering an efficient operation of a game. In addition, when the game sponsor performs shuffling, there is a problem in that there is room to perform fraudulent acts such as inserting and removing cards and replacing cards.

In order to solve such a problem, WO 2009/069708 discloses shuffled playing cards individually packaged in a state in which playing cards constituting a predetermined number of decks are shuffled. In the packaging of the shuffled playing card, a shuffled playing card ID for accessing information, which can specify a shuffle machine or a shuffle machine group shuffling the shuffled playing card, on database is assigned as an ID code.

SUMMARY

However, even if the ID code is assigned to the packaging of the shuffled playing card, when contents are replaced with a set of cards whose arrangement is known, there is no means for ascertaining whether these cards are genuine products, such that even fraudulent acts performed in a game using the set of cards cannot be found.

An object of the present invention is to provide a shuffled playing card and a method of manufacturing a playing card capable of confirming whether or not a playing card is a genuine product correctly manufactured and distributed on a sheet basis of a card base sheet.

A method of manufacturing a playing card according to an aspect of the present invention includes: a printing step of printing a suit and a rank on one surface of a card base sheet and printing a back pattern on a back surface; a sheet ID assigning step of printing different sheet IDs for one card base sheet or each of a plurality of card base sheets on the card base sheet; and a cutting step of cutting the card base sheet having undergone the printing step and the sheet ID assigning step into individual cards by a cutting machine, wherein one deck or a plurality of decks are produced from the card base sheet.

According to this aspect, since the card base sheet on which the different sheet IDs are printed for one card base sheet or each of the plurality of card base sheets is cut to produce the playing card of one deck or a plurality of decks, it is possible to confirm, on the database, the information on when the card is printed and also when the card is inspected by tracing back through the distribution history of the playing card. As a result, it is possible to confirm whether the playing card is a genuine product correctly manufactured and distributed by reading the sheet ID from the contents of the card to confirm the history on the database even if the contents of the packaged shuffled playing card are replaced with a set of cards whose arrangement is known by malicious fraudulent players.

In addition, by printing different sheet IDs for each card base sheet or a plurality of card base sheets, the ID management of the card base sheet in the factory becomes possible. For example, even when the card base sheet is discarded halfway, it is possible to manage at which stage the playing card is discarded in the database. In this way, it is possible to grasp a yield in each process at the manufacturing stage. In addition, even if malicious fraudulent players illegally obtain the discarded card base sheet and cut the obtained card base sheet by themselves to produce a counterfeit card and bring the produced counterfeit card for use in a game, the sheet ID is read from the card to confirm the history on the database, thereby making it possible to easily detect that the playing card is a counterfeit card and enhance the security of the game.

In the method of manufacturing a playing card according to the aspect of the present invention, in the printing step, the suits and the ranks corresponding to one deck or the plurality of decks may be printed on one card base sheet, and a common picture pattern may be printed on the back surface, and in the sheet ID assigning step, the common sheet ID may be printed on the card base sheets corresponding to the one deck or the plurality of decks.

In the method of manufacturing a playing card according to the aspect of the present invention, the sheet ID may be printed on the card constituting the set of decks.

In the method of manufacturing a playing card according to the aspect of the present invention, the sheet ID may be printed on a card other than the card constituting the set of decks.

In the method of manufacturing a playing card according to the aspect of the present invention, the sheet ID may be printed with transparent UV ink.

The method of manufacturing a playing card according to the aspect of the present invention may further include: a shuffling step of shuffling a plurality of decks of the playing cards by a shuffle machine to produce a set of shuffled playing cards; a packaging step of packaging a set of shuffled playing cards having undergone the shuffling step; and an ID assigning step of assigning a shuffled playing card ID as an ID code to the set of shuffled playing cards by generating different shuffled playing card IDs for each set of shuffled playing cards.

The method of manufacturing a playing card according to the aspect of the present invention may further include: a database producing step of storing the shuffled playing card ID and the sheet ID assigned to the playing card constituting the shuffled playing card by associating the shuffled playing card ID and the sheet ID with each other in the database.

In the method of manufacturing a playing card according to the aspect of the present invention, in the database producing step, the sheet ID of the card base sheet may be stored in the database in association with one or both of recording of a printing date on the card base sheet and recording of a cut date on the individual playing card.

In the method of manufacturing a playing card according to the aspect of the present invention, in the database producing step, before the shuffling step, the sheet ID read from the playing card constituting the set of decks may be stored in the database in association with the shuffled playing card ID of the shuffled playing card to which the deck belongs.

There is provided a playing card according to an aspect of the present invention, wherein a suit and a rank are printed on one surface of a card base sheet, a back pattern is printed on a back surface, different sheet IDs for one card base sheet or each of a plurality of card base sheets are printed on the card base sheet, one deck or a plurality of decks are constituted by individual cards cut from the card base sheet by a cutting machine.

In the playing card according to the aspect of the present invention, the suit and the rank corresponding to one deck or the plurality of decks may be printed on the one card base sheet, a common back pattern may be printed on the back surface, and a common sheet ID may be printed on one deck or a set of the plurality of decks.

In the playing card according to the aspect of the present invention, the sheet ID may be printed on the playing card constituting the set of decks.

In the playing card according to the aspect of the present invention, the sheet ID may be printed on a card other than the playing card constituting the set of decks.

In the playing card according to the aspect of the present invention, the sheet ID may be printed with transparent UV ink.

In the playing card according to the aspect of the present invention, the sheet ID of the card base sheet may be associated with one or both of recording of a printing date on the card base sheet and recording of a cut date on the individual playing card in the database.

There is provided a shuffled playing card according to an aspect of the present invention, wherein a plurality of decks of the playing card having any of the above features are shuffled by a shuffle machine to form a set of shuffled playing cards, and different shuffled playing card IDs for each set are assigned to the shuffled playing card as ID codes.

In the shuffled playing card according to the aspect of the present invention, the sheet ID of the playing card constituting the shuffled playing card and the shuffled playing card ID may be associated with each other in the database.

There is provided a shuffled playing card according to an aspect of the present invention, wherein a suit and a rank are printed on one surface of a card base sheet, and a back pattern is printed on another surface, different sheet IDs for one card base sheet or each of a plurality of card base sheets are printed on the card base sheet, one deck or a plurality of decks are formed by individual cards cut by a cutting machine from the card base sheet, the one deck or the plurality of decks are shuffled by a shuffle machine to form a set of shuffled playing cards, different shuffled playing card IDs for each set are assigned to the shuffled playing card as ID codes, and the sheet ID of the playing card constituting the shuffled playing card and the shuffled playing card ID are associated with each other in a database.

In the shuffled playing card according to the aspect of the present invention, the sheet ID or the sheet IDs of the playing card constituting the shuffled playing card is specifiable from the shuffled playing card ID, and the shuffled playing card ID is singularly specifiable from the sheet ID.

In the shuffled playing card according to the aspect of the present invention, the sheet ID is printed on one or a plurality of shuffled playing cards constituting a set of decks.

In the shuffled playing card according to the aspect of the present invention, the sheet ID is printed with ink invisible under a normal condition.

In the shuffled playing card according to the aspect of the present invention, the sheet ID is printed with a transparent UV ink.

In the shuffled playing card according to the aspect of the present invention, the sheet ID of the card base sheet is associated with one or both of recording of a printing date on the card base sheet and recording of a cut date on the individual playing cards in the database.

In the shuffled playing card according to the aspect of the present invention, the sheet ID or the sheet IDs associated in the database are specifiable from the shuffled playing card ID, a printing plate of the suit and the rank used for the card base sheet is specifiable from the sheet ID, and if the individual cards are specified, a position or positions of the corresponding suit and rank on the card base sheet are specifiable.

In the shuffled playing card according to the aspect of the present invention, the sheet ID is printed on a site other than a card constituting the set of decks on the card base sheet, but the sheet ID or the sheet IDs associated in the database are specifiable from the shuffled playing card ID.

In the shuffled playing card according to the aspect of the present invention, the suits or the ranks corresponding to the plurality of decks are printed on one card base sheet, a common back pattern is printed on the other surface, and different sheet IDs for each deck are printed on the set of the plurality of decks, the sheet IDs for each deck of the playing card constituting the shuffled playing card are specifiable from the shuffled playing card ID, and the shuffled playing card ID is singularly specifiable from different sheet IDs for each deck.

There is provided a shuffled playing card according to an aspect of the present invention, wherein a suit and a rank are printed on one surface of a card base sheet, and a back pattern is printed on another surface, one or each of a plurality of card base sheets have different sheet IDs, one deck or a plurality of decks are formed by individual cards cut by a cutting machine from the card base sheet, the one deck or the plurality of decks are shuffled by a shuffle machine to form a set of shuffled playing cards, the sheet ID is printed on each of the individual cards, and the card base sheet is specifiable from the sheet ID printed on the individual card.

In the shuffled playing card according to the aspect of the present invention, different shuffled playing card IDs for each set are assigned to the shuffled playing card as ID codes, and the sheet ID of the playing card constituting the shuffled playing card and the shuffled playing card ID are associated with each other in a database.

In the shuffled playing card according to the aspect of the present invention, the sheet ID or the sheet IDs of the playing card constituting the shuffled playing card are specifiable from the shuffled playing card ID, and the shuffled playing card ID is singularly specifiable from the sheet ID.

In the shuffled playing card according to the aspect of the present invention, the sheet ID is printed with ink invisible under a normal condition.

In the shuffled playing card according to the aspect of the present invention, the sheet ID is printed with a transparent UV ink.

In the shuffled playing card according to the aspect of the present invention, the sheet ID of the card base sheet is associated with one or both of recording of a printing date on the card base sheet and recording of a cut date on the individual playing card in the database.

In the shuffled playing card according to the aspect of the present invention, the sheet ID or the sheet IDs associated in the database are specifiable from the shuffled playing card ID, a printing plate of the suit and the rank used for the card base sheet is specifiable from the sheet ID, and if the individual cards are specified, a position or positions of the corresponding suit and rank on the card base sheet are specifiable.

In the shuffled playing card according to the aspect of the present invention, the sheet ID is printed on a site other than a card constituting the set of decks on the card base sheet, but the sheet ID or the sheet IDs associated in the database are specifiable from the shuffled playing card ID.

In the shuffled playing card according to the aspect of the present invention, suits or ranks corresponding to the plurality of decks are printed on one card base sheet, a common back pattern is printed on another surface, and different sheet IDs for each deck are printed on the set of the plurality of decks, the sheet IDs for each deck of the playing card constituting the shuffled playing card are specifiable from the shuffled playing card ID, and the shuffled playing card ID is singularly specifiable from different sheet IDs for each deck.

A method of manufacturing a playing card according to an aspect of the present invention includes: a printing step of printing a suit and a rank on one surface of a card base sheet and printing a back pattern on another surface; a sheet ID assigning step of printing different sheet IDs for one card base sheet or each of a plurality of card base sheets on the card base sheet; and a cutting step of cutting the card base sheet having undergone the printing step and the sheet ID assigning step into individual cards by a cutting machine; a step of producing one deck or a plurality of decks from the card base sheet; a shuffling step of shuffling the one deck or the plurality of decks by a shuffle machine to produce a set of shuffled playing cards; a packaging step of packaging a set of shuffled playing cards having undergone the shuffling step; an ID assigning step of assigning a shuffled playing card ID as an ID code to the set of shuffled playing cards by generating different shuffled playing card IDs for each set of shuffled playing cards; and a database producing step of storing the shuffled playing card ID and the sheet ID assigned to the playing card constituting the shuffled playing card by associating the shuffled playing card ID and the sheet ID with each other in database.

In the method of manufacturing a playing card according to the aspect of the present invention, the sheet ID or the sheet IDs of the playing card constituting the shuffled playing card is specifiable from the shuffled playing card ID, and the shuffled playing card ID is singularly specifiable from the sheet ID.

In the method of manufacturing a playing card according to the aspect of the present invention, the sheet ID is printed on one or a plurality of shuffled playing cards constituting a set of decks.

In the method of manufacturing a playing card according to the aspect of the present invention, the sheet ID is printed with ink invisible under a normal condition.

In the method of manufacturing a playing card according to the aspect of the present invention, the sheet ID is printed with a transparent UV ink.

In the method of manufacturing a playing card according to the aspect of the present invention, in the database producing step, the sheet ID of the card base sheet is stored in the database in association with one or both of recording of a printing date on the card base sheet and recording of a cut date on the individual playing card.

In the method of manufacturing a playing card according to the aspect of the present invention, in the database producing step, before the shuffling step, the sheet ID read from the playing card constituting the set of decks is stored in the database in association with the shuffled playing card ID of the shuffled playing card to which the deck belongs.

In the method of manufacturing a playing card according to the aspect of the present invention, the sheet ID or the sheet IDs associated in the database are specifiable from the shuffled playing card ID, a printing plate of the suit and the rank used for the card base sheet is specifiable from the sheet ID, and if the individual cards are specified, a position or positions of the corresponding suit and rank on the card base sheet are specifiable.

In the method of manufacturing a playing card according to the aspect of the present invention, in the sheet ID assigning step, the sheet ID is printed on a site other than a card constituting the set of decks on the card base sheet, but the sheet ID or the sheet IDs associated in the database are specifiable from the shuffled playing card ID.

In the method of manufacturing a playing card according to the aspect of the present invention, in the printing step, the suits or the ranks corresponding to the plurality of decks are printed on one card base sheet, a common back pattern is printed on the other surface, and different sheet IDs for each deck are printed on the set of the plurality of decks, the sheet IDs for each deck of the playing card constituting the shuffled playing card are specifiable from the shuffled playing card ID, and the shuffled playing card ID is singularly specifiable from different sheet IDs for each deck.

BRIEF DESCRIPTION OF DRAWINGS

FIG. 8 is a diagram for describing database that stores the shuffled playing card ID and the sheet ID by associating the shuffled playing card ID with the sheet ID.

DETAILED DESCRIPTION

Figure 1A:
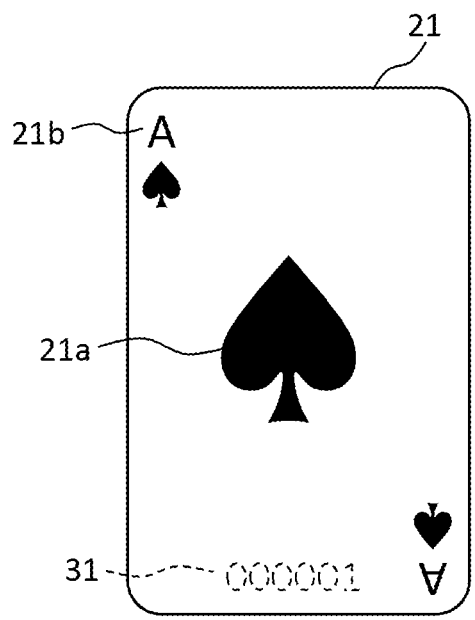
FIG. 1A is a diagram showing a front surface of a card constituting a set of decks among playing cards according to one embodiment.

Hereinafter, embodiments of the present invention will be described in detail with reference to the accompanying drawings. In the respective drawings, constituent elements having equivalent functions are denoted by the same reference numerals, and the detailed description of the constituent elements denoted by the same reference numerals is not repeated.

Figure 1B:
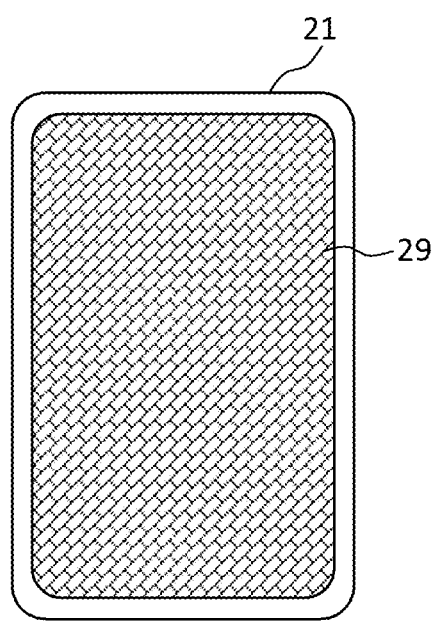
FIG. 1B is a diagram showing a back surface of the card.
Figure 2A:
FIG. 2A is a diagram showing a front surface of a card other than the card constituting a set of decks among playing cards according to one embodiment.

FIG. 1A is a diagram showing a front surface of a card constituting a set of decks among playing cards according to one embodiment, and FIG. 1B is a diagram showing a back surface of the card. FIG. 2A is a diagram showing a front surface of a card other than the card constituting a set of decks among playing cards according to one embodiment, and FIG. 2B is a diagram showing a back surface of the card.

As shown in FIGS. 1A and 1B, a set of playing cards according to the present embodiment has 4×13=52 cards 21 which are constituted by a combination of four suits 21*a* (that is, spade, club, diamond, and heart) and 13 ranks 21*b* (that is, ace (A), 2, 3, 4, 5, 6, 7, 8, 9, 10, jack (J), queen (Q), and king (K)) as a card constituting a set of decks.

Figure 2B:
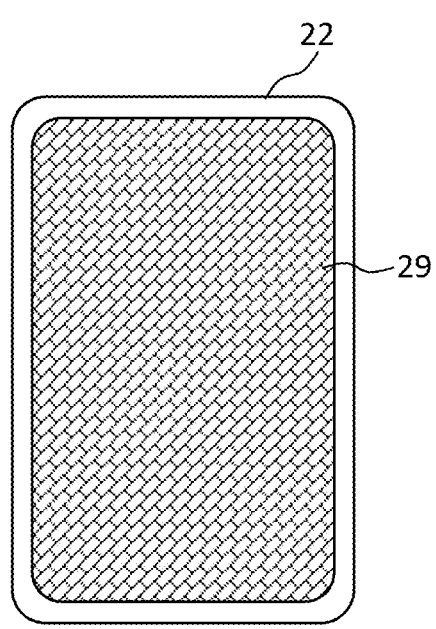
FIG. 2B is a diagram showing a back surface of the card.

In addition, as shown in FIGS. 2A and 2B, the set of playing cards according to the present embodiment further has a "joker" card 22 as a card other than the cards constituting the set of decks. The "joker" card 22 included in one set of playing cards may be one sheet or two sheets. The "joker" card 22 is a card which is removed and discarded before a shuffling process at the time of producing a shuffled playing card to be described later.

The set of playing cards 21 and 22 according to the present embodiment are formed by being individually cut from one card base sheet 20 (see FIG. 4) by a cutting machine.

As shown in FIGS. 1A and 1B and FIGS. 2A and 2B, common sheet IDs 31 and 32 are printed on front surfaces of each of the set of playing cards 21 and 22, and a common back pattern 29 is printed on a back side thereof. The sheet IDs 31 and 32 may be a character code including a plurality of figures, alphabets, or symbols, or may be a bar code or a two-dimensional code in which the character code is encoded.

As shown in FIGS. 1A and 1B, the sheet ID 31 printed on the card 21 constituting the set of decks may be printed with ink (for example, transparent UV ink) invisible to human eyes, or may be printed with ink (for example, black ink) visible to human eyes. When the sheet ID 31 is printed with ink (for example, transparent UV ink) invisible to human eyes, the appearance becomes similar to that of the conventional card, and thus a user of the card can use the card without feeling uncomfortable. On the other hand, when the sheet ID 31 is printed with ink (for example, black ink) visible to the human eyes, although there is a possibility that the user of the card may feel uncomfortable, the sheet ID 31 is simply an ID code, and therefore it does not cause special problems in the game.

In addition, as shown in FIGS. 2A and 2B, the sheet ID 32 printed on a card 22 other than the card constituting the set of decks may be printed with ink (for example, transparent UV ink) invisible to human eyes, or may be printed with ink (for example, black ink) visible to human eyes. When the card printed with ink (for example, black ink) visible to human eyes, a manufacturer can easily confirm the sheet ID 32 in the manufacturing process to be described later when inspecting quality of the printed card base sheet.

As shown in FIG. 8, the sheet IDs 31 and 32 printed on the respective playing cards 21 and 22 are stored in the database in association with one or both of recording of a printing date of the sheet ID on the original card base sheet 20 and recording of a cut date on the individual playing cards 21 and 22.

Figure 6:
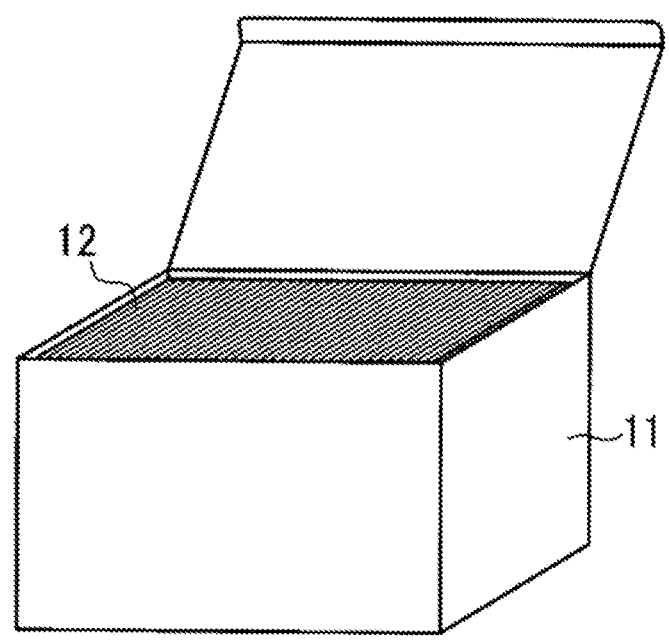
FIG. 6 is a diagram showing a shuffled playing card manufactured by the method of manufacturing a playing card according to one embodiment, and is a diagram showing the shuffled playing card before a lid of a package is sealed with a seal.
Figure 7:
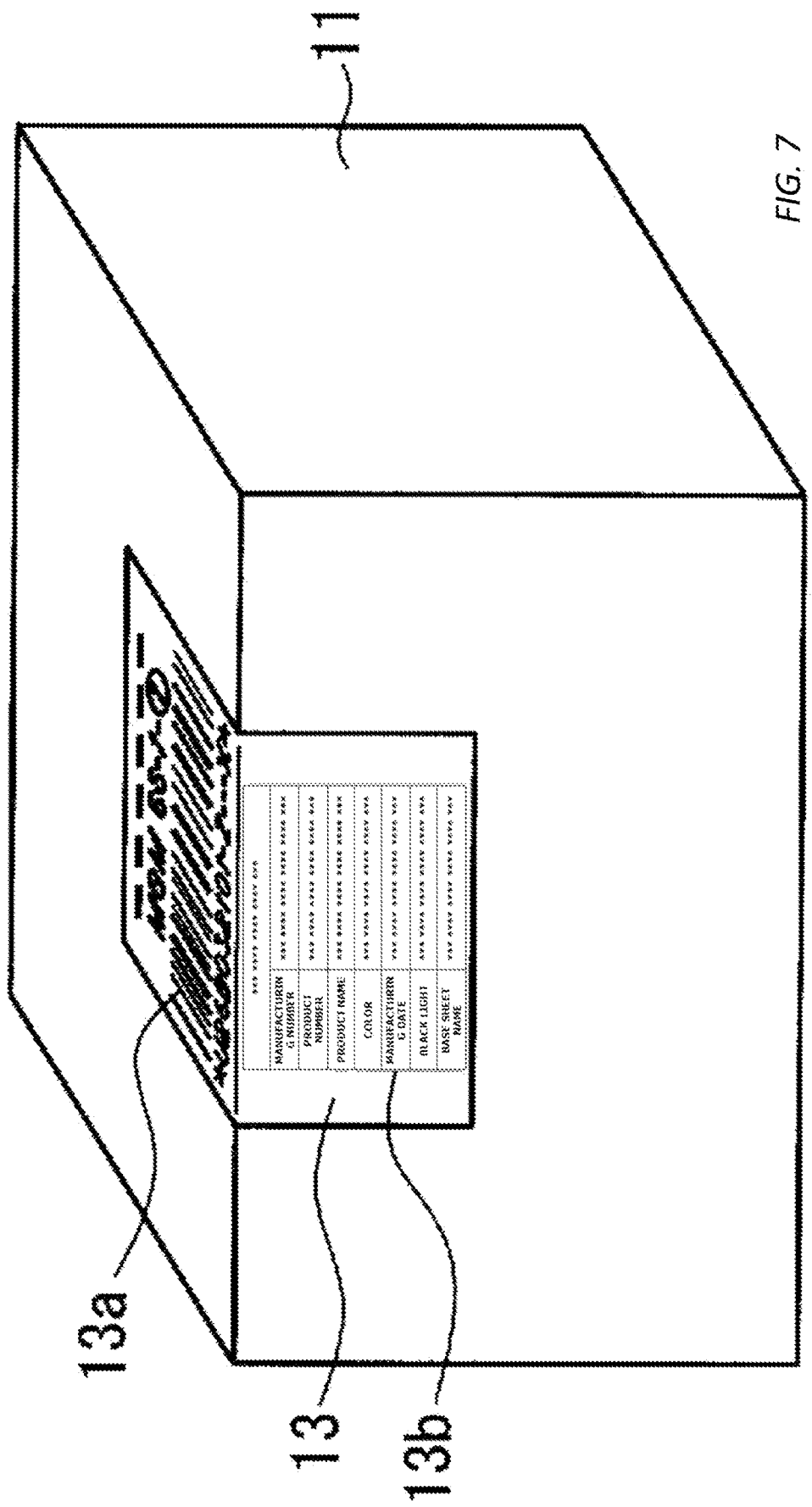
FIG. 7 is a diagram showing the shuffled playing card according to one embodiment, and is a diagram showing the shuffled playing card in which a shuffled playing card ID is assigned to the seal for sealing the lid of the package.

FIG. 6 is a diagram showing a shuffled playing card according to the present embodiment, and is a diagram showing the shuffled playing card before a package is sealed with a seal. FIG. 7 is a diagram showing the shuffled playing card according to the present embodiment, and is a diagram showing the shuffled playing card in which a shuffled playing card ID is assigned to the seal for sealing the package.

The shuffled playing card 12 according to the present embodiment is a card in which a plurality of decks (for example, four decks or eight decks) of the above-described playing card 21 are one set, and is sufficiently shuffled by a shuffle machine. In the shuffled playing card 12, different shuffled playing card IDs 13*a* are assigned as ID codes for each set. In the shown example, the shuffled playing card 12 is housed in a box-shaped package 11 and a lid thereof is sealed with a seal 13. The shuffled playing card ID 13*a* is encoded as a bar code and printed on the seal 13 which seals the package 11.

As shown in FIG. 8, the sheet ID 31 of the playing card 21 constituting the shuffled playing card 12 and the shuffled playing card ID 13*a* are stored in the database in association with each other.

Figure 3:
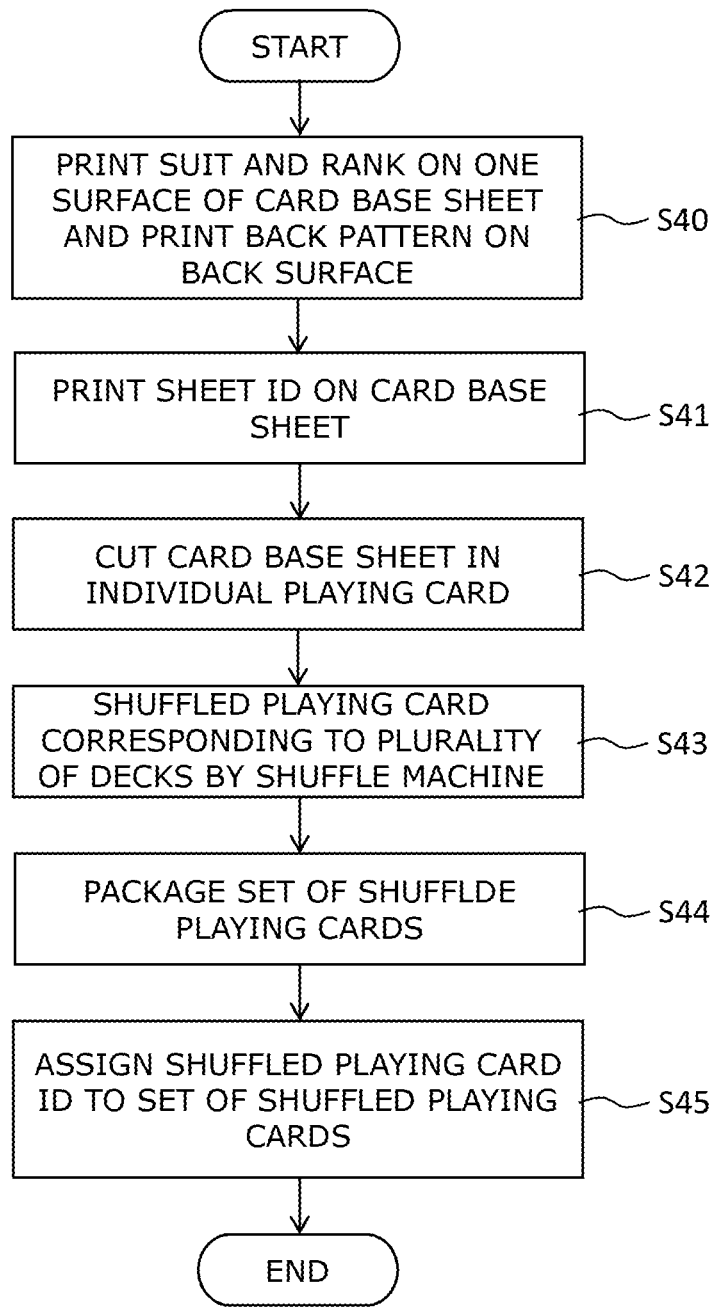
FIG. 3 is a flowchart for describing a method of manufacturing a playing card according to one embodiment.

Next, a method of manufacturing a playing card 21 and a shuffled playing card 12 according to the present embodiment will be described. FIG. 3 is a flowchart showing a method of manufacturing a playing card 21 and a shuffled playing card 12 according to the present embodiment.

In the manufacturing process of the playing card 21 and the shuffled playing card 12 according to the present embodiment, it is preferable for a process management system to consistently perform process management from order to shipment. In the present embodiment, a manufacturing method using such a process management system will be described.

Figure 4:
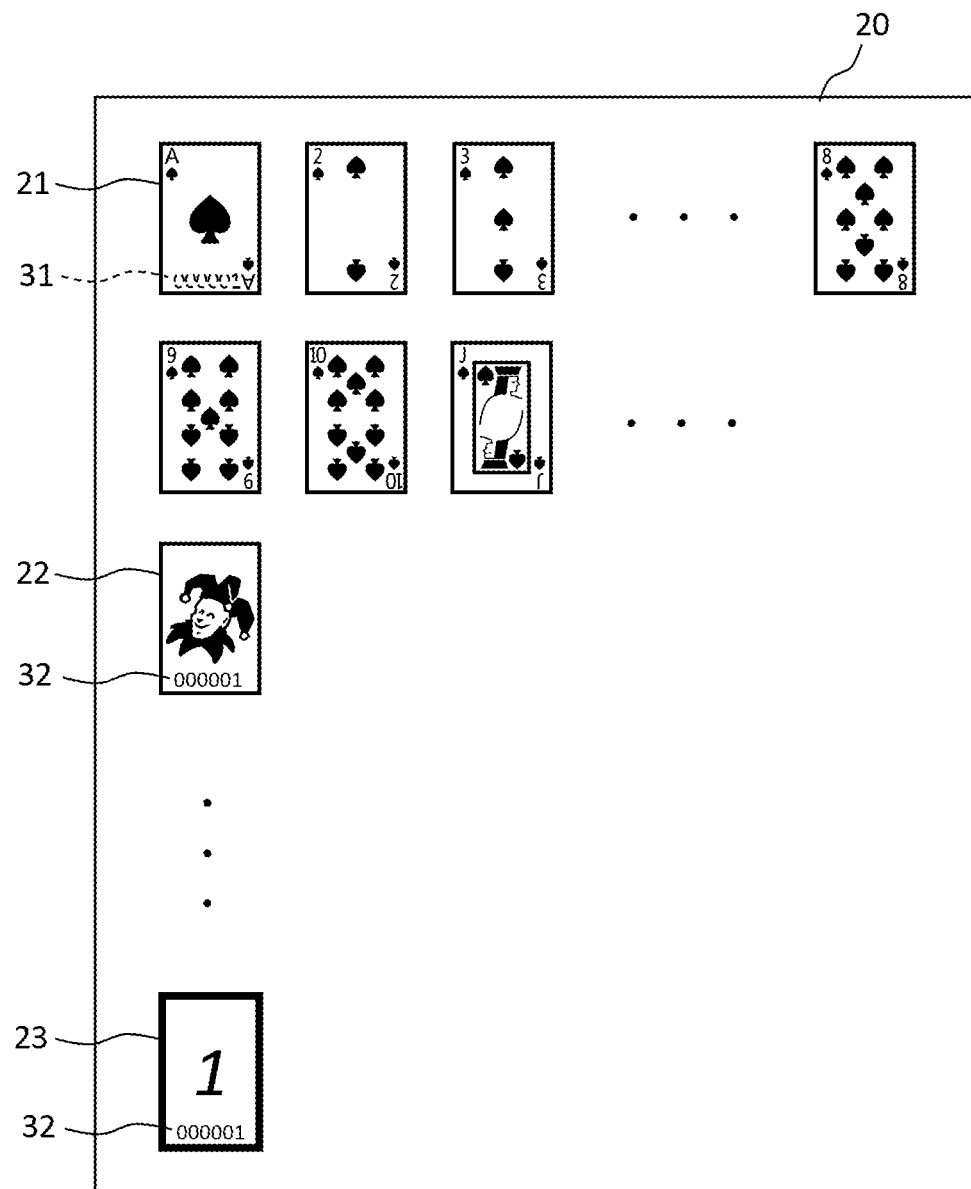
FIG. 4 is a diagram showing a card base sheet used in the method of manufacturing a playing card according to one embodiment, and is a diagram showing a card base sheet on which a sheet ID is printed.

As shown in FIGS. 3 and 4, first, as a printing process, a printing machine prints a suit and a rank on the front surface of the card base sheet 20, and prints a back pattern on a back surface thereof (step S40). In the shown example, a total of 56 cards including 52 cards 21 including a combination of four suits and 13 ranks, one "joker" card 22, and three other cards 23 are printed in a matrix arrangement of 8 rows×7 columns.

Figure 5:
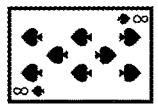
FIG. 5 is a diagram showing a card base sheet used in the method of manufacturing a playing card according to one embodiment, and is a diagram showing a modification of a card base sheet on which a sheet ID is printed.
Figure 5:
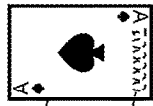
Figure 5:
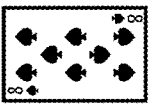
Figure 5:
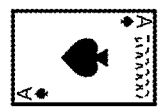
Figure 5:
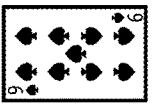
Figure 5:
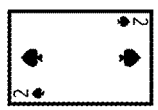
Figure 5:
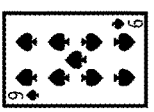
Figure 5:
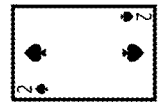
Figure 5:
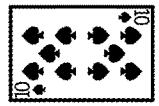
Figure 5:
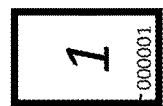

As one modification, as shown in FIG. 5, a total of 105 cards including two decks of 52 cards 21 including a combination of four suits and 13 ranks and one other card 23 may be printed in a matrix arrangement of 7 rows×15 columns.

Next, as a sheet ID assigning step, the process management system assigns different sheet IDs to each card base sheet or the plurality of card base sheets and the printing machine prints the sheet IDs 31 and 32 on the front surface of the card base sheet 20 (step S41). In addition, by the process management system, the sheet IDs 31 and 32 and the printing dates of the sheet IDs 31 and 32 on the card base sheet 20 are stored in the database in association with each other (see FIG. 8). Although not shown in the drawing, the sheet IDs 31 and 32 may be stored in the database in association with one or two or more of a factory name, a manufacturing line, a customer name (casino name).

In the present embodiment, the sheet ID 31 is printed on the card 21 constituting a set of decks with ink (for example, transparent UV ink) invisible to human eyes. As a result, the card 21 constituting the set of decks has the same appearance as a conventional card, and thus the user of the card can use the card without feeling uncomfortable. It should be noted that the sheet ID 31 may be printed only on a specific card (for example, spade A) among the cards 21 constituting the set of decks, or may be printed on all the cards.

On the other hand, the sheet ID 32 is printed on the cards 22 and 23 other than the card constituting the set of decks with ink (for example, black ink) visible to human eyes. As a result, when the manufacturer can easily confirm the sheet ID when inspecting the quality of the printed card base sheet.

In the present embodiment, the sheet ID assigning process (step S41) is performed after the printing process (step S40), but the present embodiment is not limited thereto, and the printing process (step S40) may be performed after the sheet ID assigning process (step S41).

Next, the card base sheet 20 having undergone the printing process (step S40) and the sheet ID assigning process (step S41) is cut into individual cards 21, 22, and 23 by the cutting machine (step S42). By removing cards 22 and 23 other than the cards constituting the set of decks from the cut card, the playing card 21 corresponding to one deck (corresponding to two decks from the card base sheet 20 shown in FIG. 5) is produced.

The sheet ID 31 is read from the playing card 21 constituting the set of decks by the process management system before being shuffled or during being shuffled by the shuffle machine to be described later and is stored in the database in association with the shuffle machine (or shuffle machine group) and shuffled date and time (see FIG. 8).

Next, as the shuffling process, the plurality of decks (for example, four decks or eight decks) of playing card 21 are shuffled by the shuffle machine, and the set of shuffled playing cards 12 is produced (step S43). As the shuffle machine, for example, the shuffle machine described in WO 2009/069708 can be used.

Next, the set of shuffled playing cards 12 which has undergone the shuffling process (step S43) is packaged by a packaging machine (step S44). In the present embodiment, as shown in FIG. 6, the set of shuffled playing cards 12 is housed in the box-shaped package 11. The material of the package 11 is not particularly limited, and may be paper or a resin film. As shown in FIG. 7, the lid of the package 11 is sealed with the seal 13.

Next, different shuffled playing card IDs are generated for each set of shuffled playing cards by the process management system, and the shuffled playing card ID 13*a* is assigned to the set of shuffled playing cards 12 as the ID code (step S45). In the shown example, the shuffled playing card ID 13*a* is encoded as the bar code and is printed on the seal 13 sealing the lid of the package 11 by the printing machine.

In the shown example, in addition to the shuffled playing card ID 13*a*, a specification table 13*b* is printed on the seal 13. For example, arbitrary information such as a manufacturing number, a product number, a product name, a color, and a manufacturing date of the shuffled playing card is described in the specification table 13*b*.

Further, by the process management system, the sheet ID 31 read from the playing card 21 constituting the set of decks before the shuffling process (step S43) is stored in the database in association with the shuffled playing card ID 13*a* of the set of shuffled playing cards 12 to which the deck belongs (see FIG. 8). In the shown example, the set of shuffled playing cards 12 are configured from the playing cards 21 corresponding to four decks, and four sheet IDs 31 are stored in the database in association with each shuffled playing card ID 13*a*.

According to the present embodiment, since the card base sheet 20 on which the different sheet IDs 31 and 32 are printed for one card base sheet or each of the plurality of card base sheets is cut to produce the playing card 21 of one deck or a plurality of decks, it is possible to confirm, on the database, the information on when the card is printed and also when the card is inspected by tracing back through the distribution history of the playing card 21. As a result, it is possible to confirm whether the playing card is a genuine product correctly manufactured and distributed by reading the sheet ID 31 from the contents of the card to confirm the history on the database in units of sheet even if the contents of the packaged shuffled playing card 12 are replaced with a set of cards whose arrangement is known by malicious fraudulent players.

In addition, by printing different sheet IDs 31 and 32 for each card base sheet or the plurality of card base sheets, the ID management of the card base sheet 20 in the factory becomes possible. For example, even when the card base sheet 20 is discarded halfway, it is possible to manage at which step the playing card is discarded in the database. In this way, it is possible to grasp a yield in each process at the manufacturing stage. In addition, it will be able to be understood whether the card of the card base sheet which is determined to be defective in each process and thus discarded is inadvertently mixed in goods (that is, it will be able to be understood whether only cards of good card base sheet are used for goods). In addition, even if malicious fraudulent players illegally obtain the discarded card base sheet 20 and cut the obtained card base sheet by themselves to produce a counterfeit card and bring the produced counterfeit card for use in a game, the sheet ID 31 is read from the card to confirm the history on the database, thereby making it possible to easily detect that the playing card is a counterfeit card and enhance the security of the game.

In addition, in the above-described embodiment, in the sheet ID assigning step, as shown in FIGS. 6 and 7, the sheet IDs 31 and 32 are printed on a part of the card base sheet 20 on which the cards 21 to 23 are printed, but the present embodiment is not limited thereto, and the sheet ID may also be printed on a part of the card base sheet 20 on which the card is not printed. In this case, it is possible to acquire the sheet ID from the remaining part (so-called punching scrap) after removing the cards 21 to 23 from the card base sheet 20.

The above-described embodiments are described for the purpose of enabling those skilled in the art to which the present invention belongs to implement the present invention. Various modifications of the above embodiments are obvious to those skilled in the art, and the technical idea of the present invention can be applied to other embodiments. Accordingly, the present invention is not limited to the embodiments described, but should be the broadest scope in accordance with the technical idea defined by the claims.

What is claimed:

1. A card set including one or more decks of shuffled playing cards shuffled by a shuffle machine, wherein:
    each of a plurality of the playing cards has a respective combination of suit and rank printed on a first surface of the respective card, and has a back pattern printed on a second surface of the respective card;

each of one or more of the playing cards has printed thereon a sheet ID uniquely assigned to a card base sheet from which the respective playing card was cut by a cutting machine; and the card set is assigned a unique card set ID that is recorded in a database in association with the sheet ID.

2. The card set according to claim 1, wherein the sheet ID or, where different ones of the one or more of the playing cards of the card set are cut from different card base sheets, each of the sheet IDs, is identifiable from the card set ID, and the card set ID is identifiable from the sheet ID.

3. The card set according to claim 1, wherein the print of the sheet ID on the playing cards is with ink that is invisible under irradiation with light of a visible light spectrum.

4. The card set according to claim 1, wherein the print of the sheet ID on the playing cards is with a UV ink.

5. The card set according to claim 1, wherein the sheet ID is associated by the database with one or both of a printing date on which the card base sheet was printed and a cut date on which individual ones of the playing cards were cut from the card base sheet.

6. The card set according to claim 1, wherein:

the sheet ID is identifiable from the card set ID;

a printing plate used for printing suits and ranks on the card base sheet is identifiable from the sheet ID or, where different ones of the one or more of the playing cards of the card set are cut from different card base sheets, each of the sheet IDs; and the database identifies respective positions at which respective ones of a plurality of combinations of suit and rank were positioned on the card base sheet.

7. A card set including one or more decks of shuffled playing cards shuffled by a shuffle machine, wherein:

each of a plurality of the playing cards has a respective combination of suit and rank printed on a first surface of the respective card, and has a back pattern printed on a second surface of the respective card;

each of one or more of the playing cards has printed thereon a sheet ID uniquely assigned to a card base sheet (a) from which the respective playing card was cut by a cutting machine and (b) that is identifiable from the sheet ID printed on the playing cards.

8. The card set according to claim 7, wherein the set is assigned a unique card set ID associated in a database with the sheet ID or, where different ones of the one or more of the playing cards of the card set are cut from different card base sheets, sheet IDs.

9. The card set according to claim 8, wherein:

the sheet ID or, where different ones of the one or more of the playing cards of the card set are cut from different card base sheets, each of the sheet IDs, is identifiable from the card set ID, and the card set ID is identifiable from the sheet ID or, where different ones of the one or more of the playing cards of the card set are cut from different card base sheets, sheet IDs.

10. The card set according to claim 8, wherein:

the sheet ID or, where different ones of the one or more of the playing cards of the card set are cut from different card base sheets, each of the sheet IDs, is identifiable from the card set ID;

the sheet ID or, where different ones of the one or more of the playing cards of the card set are cut from different card base sheets, each of the sheet IDs, is such that a printing plate used for printing suits and ranks on the respective card base sheet is identifiable from the respective sheet ID; and the database identifies respective positions at which respective ones of a plurality of combinations of suit and rank were positioned on the respective card base sheet.

11. The card set according to claim 8, wherein the sheet ID or, where different ones of the one or more of the playing cards of the card set are cut from different card base sheets, each of the sheet IDs, is additionally printed on a site of the respective card base sheet other than at which any playing card is printed and is identifiable by the database from the card set ID.

12. The card set according to claim 7, wherein the print of the sheet ID or, where different ones of the one or more of the playing cards of the card set are cut from different card base sheets, each of the sheet IDs, on the respective playing cards is with ink that is invisible under irradiation with light of a visible light spectrum.

13. The card set according to claim 7, wherein the print of the sheet ID or, where different ones of the one or more of the playing cards of the card set are cut from different card base sheets, each of the sheet IDs, on the respective playing cards is with a UV ink.

14. The card set according to claim 7, wherein the sheet ID or, where different ones of the one or more of the playing cards of the card set are cut from different card base sheets, each of the sheet IDs, is associated by a database with one or both of a respective printing date on which the respective card base sheet was printed and a respective cut date on which individual ones of the playing cards were cut from the card base sheet.

15. The card set according to claim 7, wherein:

at least two of the playing cards of the card set are cut from different card base sheets so that the sheet ID differs between those at least two playing cards;

the set is assigned a unique card set ID associated in a database with each of the sheet IDs;

the respective card base sheet initially includes a plurality of combinations of suits and ranks corresponding to a plurality of the playing cards of the card set printed on a first surface of the respective card base sheet and the back pattern printed on a second surface of the respective card base sheet immediately opposite the printing of each of the printed combinations of suits and ranks on the first surface;

all of the sheet IDs from which all of the playing cards of the card set are cut are identifiable from the card set ID in the database; and the card set ID is identifiable in the database from all of the sheet IDs from which all of the playing cards of the card set are cut.

16. A method comprising:

printing combinations of suits and ranks on a first surface of a card base sheet to form on the card base sheet respective representations of a plurality of cards;

printing a back pattern on a second surface of the card base sheet opposite the first surface;

printing on each of one or more of the representations of the plurality of cards on the card base sheet a sheet ID uniquely assigned to the card base sheet;

cutting the plurality of cards with a cutting machine from the card base sheet on which the sheet ID was printed;

producing one or more decks from the plurality of cards cut from the card base sheet;

shuffling at least the one or more decks by a shuffle machine to produce at least part of a set of shuffled playing cards;

packaging the produced set of shuffled playing cards;

assigning to the produced set of shuffled playing cards a unique card set ID code that is different than other card set ID codes assigned to other sets of shuffled playing cards; and storing the assigned card set ID code and the sheet ID in a database in association with each other.

17. The method according to claim 16, wherein the sheet ID or, where different ones of the playing cards of the card set, on whose respective representations the sheet ID is printed, are cut from different card base sheets, each of the sheet IDs, is identifiable from the card set ID, and the card set ID is identifiable from the sheet ID.

18. The method according to claim 16, wherein the printing of the sheet ID is with ink that is invisible under irradiation with light of a visible light spectrum.

19. The method according to claim 16, wherein the printing of the sheet ID is with a UV ink.

20. The method according to claim 16, further comprising associating, in the database, the sheet ID with one or both of a printing date on which the printing was performed and a cut date on which the cutting was performed.

21. The method according to claim 16, wherein the storing includes reading the sheet ID prior to the shuffling.

22. The method according to claim 16, wherein:

the sheet ID or, where different ones of the playing cards of the card set, on whose respective representations the sheet ID is printed, are cut from different card base sheets, each of the sheet IDs, is identifiable from the shuffled playing card ID;

a printing plate used for the printing of the combinations of suits and ranks on the card base sheet is identifiable from the sheet ID; and the database identifies respective positions at which respective ones of the combinations of suit and rank were positioned on the card base sheet.

23. The method according to claim 16, wherein the sheet ID is additionally printed on a site of the card base sheet other than at which any playing card is printed.

24. The method according to claim 16, wherein:

the set further includes one or more other decks of shuffled playing cards cut from another card base sheet to which a different sheet ID is assigned;

all of the sheet IDs from which all of the playing cards of the card set are cut are identifiable from the card set ID in the database; and the card set ID is identifiable in the database from all of the sheet IDs from which all of the playing cards of the card set are cut.

25. The method according to claim 16, wherein:

the printing of the sheet ID on the card base sheet and the cutting are performed such that as a result of the printing and cutting, the sheet ID is printed on each of one or more playing cards of the plurality of cards and on each of one or more other cards of the plurality of cards;

the sheet ID printed on each of the one or more playing cards is with ink that is invisible under irradiation with light of a visible light spectrum; and the sheet ID printed on each of the one more other cards is with ink that is visible under the irradiation with the light of the visible light spectrum.

26. An arrangement comprising:

a database;

a card base sheet to which a sheet ID is uniquely assigned; and a card set including one or more decks of shuffled playing cards cut by a cutting machine from the card base sheet and shuffled by a shuffle machine, wherein:

each of one or more of the playing cards has the sheet ID printed thereon;

each of the playing cards has a respective combination of suit and rank printed on a first surface of the respective card, and has a back pattern printed on a second surface of the respective card;

a card set ID that is uniquely assigned to the card set is stored in the database in association with the sheet ID.

27. The card set according to claim 26, wherein the sheet ID is additionally printed on a site of the card base sheet other than at which any playing card is printed.

28. The card set according to claim 26, wherein:

the card base sheet initially includes a plurality of combinations of suits and ranks corresponding to a plurality of the playing cards of the card set printed on a first surface of the card base sheet and a common back pattern printed on a second surface of the card base sheet immediately opposite the printing of each of the printed combinations of suits and ranks on the first surface;

all of the sheet IDs from which all of the playing cards of the card set are cut are identifiable from the card set ID in the database; and the card set ID is identifiable in the database from all of the sheet IDs from which all of the playing cards of the card set are cut.

* * * * *